United States Patent Office
3,298,167
Patented Jan. 17, 1967

3,298,167
TWO-FOR-ONE TWISTING SPINDLE
Johann Jacob Keyser, 16 Grabenallee, Aarau, Switzerland
Filed June 28, 1965, Ser. No. 467,270
Claims priority, application Germany, July 2, 1964,
K 53,369
7 Claims. (Cl. 57—58.84)

The present invention relates to a two-for-one twisting spindle. Two-for-one twisting spindles are known which have a rotatably journalled hollow shank on which is mounted a radially extending thread storage disc with overflow dish. With these known two-for-one twisting spindles, the thread guiding passages for guiding the thread extend from the inside toward the outside. The connection of the thread storage disc with overflow dish to the hollow shank is effected by special connecting means, for instance by clamping nuts screwed onto the hollow shank, said thread storage disc with overflow dish being clamped to the hollow shank between said clamping nuts.

It is an object of the present invention to provide an improved connection of the thread storage disc with overflow dish to the rotatable shaft.

It is another object of this invention to simplify the connection of the thread storage disc with overflow dish to the hollow shank while greatly facilitating the assembly and disassembly of said disc.

These and other objects and advantages of the invention will appear more clearly from the following specification in connection with the accompanying drawings, in which.

Figure 1:
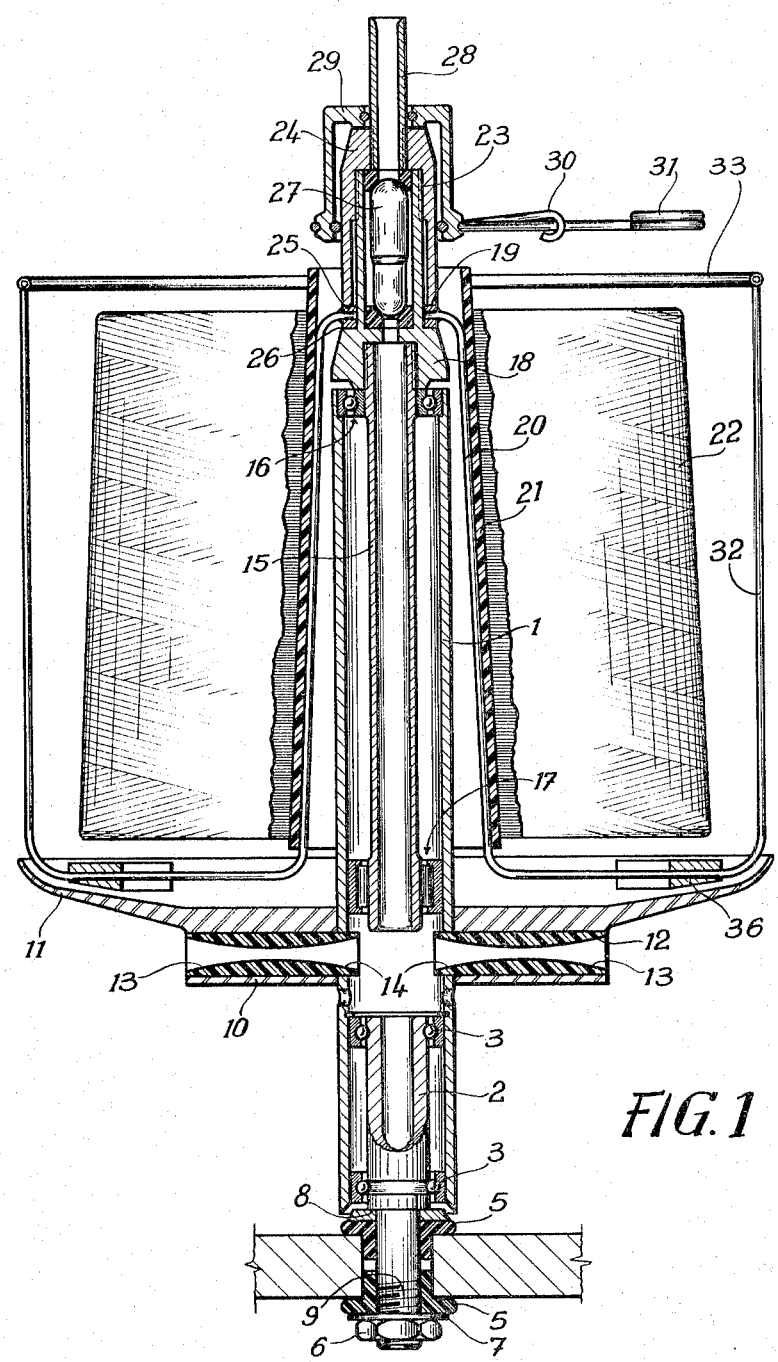
FIGURE 1 is a vertical section through a two-for-one spindle according to the present invention.

The two-for-one twisting spindle according to the present invention is characterized primarily in that the thread storage disc together with the overflow dish is slipped in axial direction onto the hollow shank of the spindle and has at least two radially extending bores in which two thread guiding tubes are respectively fitted. Each of said tubes has its inner end engaging a corresponding bore in the hollow shank whereby the thread storage disc with overflow dish is definitely located on the hollow shank.

The thread guiding tubes may consist of a particularly wear resistant material, for instance of a ceramic material by which, customarily, at least the outer edges of the thread guiding passages are reinforced. Such ceramic material may, for instance, be sinter-corundum.

The insertion of the thread guiding tubes permits the design of the hollow shank in the form of a continuous cylindrical pipe which, for purposes of locating the thread storage disc with overflow dish has merely to be provided with radial bores, while no cutting of thread or the like is required.

According to a further development of the present invention, the turntable may have its bottom side provided with an annular groove by means of which radial bores in the turntable are cut open. In this way, the mass of the turntable is reduced without impairing the thread guiding through the thread guiding tubes. This feature also permits the compensation of unbalance of the spindle as such unbalance may occur, for instance, by the yarn sleeves or yarn sleeve carriers to be mounted on the spindle. More specifically, according to another feature, the thread guiding tube is at least within the range of the two bore sections in the turntable provided with annular grooves into which split spring rings are insertable. Thus, a greater or smaller number of spring rings can be mounted in order in this way to compensate for an unbalance. Moreover, the said spring rings may also be employed for axially locating and arresting the thread guiding tubes so that no additional steps have to be taken in order to prevent the thread guiding tubes from slipping out of the radial bores. For instance, a press fit will suffice, whereas, without the employment of said spring rings, a force fitting will be a necessity which, however, requires a particularly precise manufacture of the turntable.

The hollow shank of such spindle has to receive the thread guiding tube which extends axially from the top up to the level of the thread storage disc so that the hollow shank has a relatively large diameter. In order to keep the diameter of the bearings below the thread storage disc at a minimum, the hollow shank may be journalled on the outer race rings of anti-friction bearings which, in their turn, are journalled on a pivot connected to the spindle rail.

If, however, a hollow shank of the above-mentioned type is to be journalled from the outside, it is desirable to select its outer diameter as small as possible in order to be able to employ anti-friction bearings with a relatively short diameter only. Therefore, it is desirable that the hollow shank within the range of the bearings will, in this instance, have a corresponding reduced portion. To this end it is provided, according to the present invention, that the hollow shank is composed of two shank sections of which the lower shank section is inserted into the upper shank section within the range of the thread storage disc and is positively connected thereto by means of the two radially extending thread guiding tubes. Also, in this instance, a hollow continuous spindle shank is obtained which is offset at its reduced portion. The said reduction is obtained by an interengagement of two tubular bodies which are located in a fixed relative position with regard to each other by the radially extending thread guiding tubes. This permits journalling of the hollow shank in bearings which do not engage the hollow shank from the outside.

Figure 2:
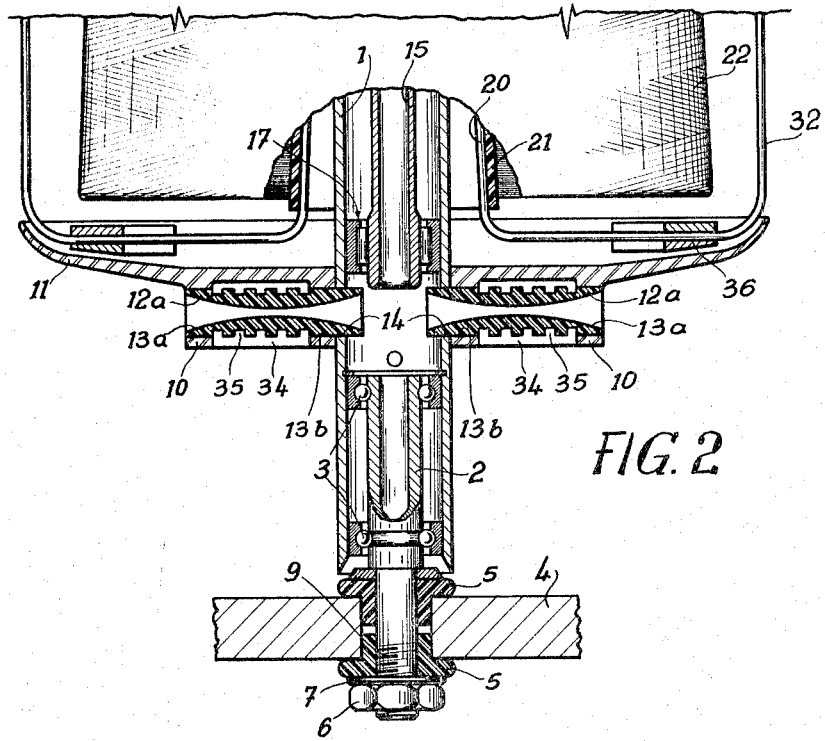
FIGURE 2 shows a vertical section through the lower portion of a modified two-for-one twisting spindle according to the invention.

Referring now to the drawings in detail, and FIGS. 1 and 2 thereof in particular, the main portion of the two-for-one twisting spindle is formed by a cylindrical hollow shank 1 which is rotatably journalled on bearing pipe 2 by means of anti-friction bearings 3. Bearing pipe 2 is clamped fast to a spindle rail 4 by means of bushings 5 and a nut 6 with washer 7 on one hand, and by a supporting shoulder 8 on the other hand. For this purpose the lower end of bearing tube 2 is provided with a thread 9. That portion of hollow shank 1 which extends around the bearing pipe 2 forms the whorl.

The thread storage disc 10 with overflow dish 11 is slipped onto hollow shank 1 and is located above said whorl section of hollow shank 1 and held in its respective location by means of thread guiding tubes 12 which are slipped into bores 13 of thread storage disc 10 and are firmly held therein. The thread guiding tubes 12 preferably consist of a wear resistant material, for instance a ceramic material of the type mentioned above. Tubes 12 extend radially inwardly through bores 14 in hollow shank 1 whereby the thread storage disc 10 is definitely located on hollow shank 1.

The arrangement of the thread guiding tubes 12 along a common diameter line or in axial alignment with each other greatly simplifies the threading operation, because a thread inserted from the top downwardly and protruding therefrom can easily, by means of a straight threading needle, be pulled radially through one of the thread guiding tubes. This pulling may also be effected pneumatically by blowing air through the thread guiding tubes 12 or by drawing air therethrough and thereby drawing out the thread.

Within hollow shank 1, and more specifically within the section above the thread storage disc 10, thread guiding pipe 15 is by means of bearings 16 and 17 rotatably journalled while the lower end of thread guiding pipe 15 extends into about the range of the thread guiding tubes 12. The free end of thread guiding pipe 15 has threaded thereon a sleeve 18 the shoulders 19 of which support the wire basket 20 with its holding ring 26, said basket 20 receiving the sleeve 21 with yarn body 22. Threaded onto the reduced shank 23 of bushing 18 is a cap 24 which, by means of its lower end faces 25, clamps fast the holding ring 26 of the wire basket 20.

Within the reduced ends 23 of sleeve 18 there is provided a thread brake 27 which at its upper end rests against cap 24 into which the short thread guiding tube 28 is axially screwed. Placed upon thread guiding tube 28 is a further cap 29 carrying the rotating thread guiding member 30 with thread guiding eye 31.

As will be seen from the drawing, wire basket 20 has an inner conical portion flaring in downward direction for receiving sleeve 21. At its lower end, said conical wire basket portion has radially outwardly extending arms which finally extend upwardly, thereby forming legs 32. The ends of legs 32 are interconnected by a ring 33. Wire basket 20 thus at the same time forms the protective basket for yarn body 22. The radially outwardly directed parts of wire basket 20 have threaded thereon magnets 36 facing counter-magnets (not shown in the drawing), which are stationarily connected to the machine frame in order to prevent the wire basket 20 and thus also sleeves 21 with yarn body 22 from rotating together with hollow shank 1.

Referring now to FIG. 2, the two-for-one spindle shown therein differs from that of FIG. 1 in that the thread storage disc 10 with overflow dish 11 has its bottom side provided with an annular groove 34 by means of which the bores 13 in thread storage disc 10 are subdivided into two bore sections 13a and 13b. Into these bore sections 13a and 13b are inserted thread guiding tubes 12a which extend radially inwardly into bores 14 of hollow shank 1 and which locate the thread storage disc 10 on hollow shank 1. In contrast to the arrangement of FIG. 1, according to FIG. 2 the thread guiding tubes 12a have annular grooves 35 located between the bore sections 13a and 13b. These annular grooves 35 are adapted to receive split spring rings (not shown) for purposes of compensating for unbalances. These split rings may at the same time also be employed for axially locating and holding the thread guiding tubes 12a in the bore sections 13a and 13b.

As will be evident from FIGS. 1 and 2, it is particularly advantageous that the thread guiding tubes 12, 12a serve not only for the purpose of guiding the thread but in addition also bring about the locating and holding of the thread storage disc 10 with overflow dish 11 on hollow shank 1, while no difficulties are encountered in disassembling the spindle into its individual parts or to exchange the thread guiding tubes 12, 12a, if such exchange should become necessary.

Figure 3:
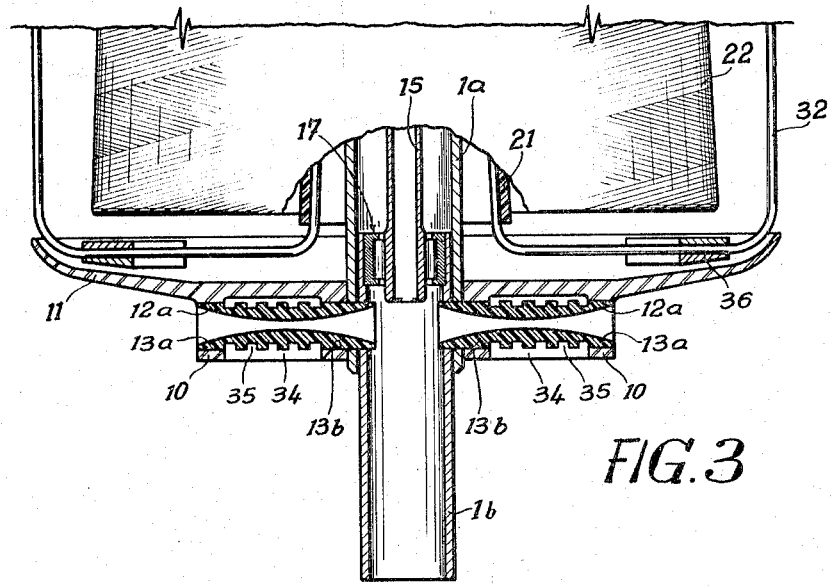
FIGURE 3 is a section similar to that of FIGURE 2 and illustrates the lower portion of still another modification of a spindle according to the invention in which, in contrast to the arrangement of FIGS. 1 and 2, the hollow shank is composed of two shank sections.

The embodiment illustrated in FIG. 3 has thread guiding tubes similar to the thread guiding tubes 12a of FIG. 2. However, in contrast to FIGS. 1 and 2, the hollow shank of the arrangement of FIG. 3 is composed of two shank sections 1a and 1b. Shank section 1b is within the range of the thread storage disc 10 inserted from below into shank portion 1a. Thread guiding tubes 12a have their inner ends passed through both shank sections 1a and 1b so that shank portions 1a and 1b are positively interconnected. The upper bearing for section 1a corresponds to bearing 16 of FIG. 1 and is located in the upper end of shank section 1a, whereas the lower bearing 17 located in the upper end of the lower shank section 1b journals both the upper shank section 1a and the lower shank section 1b. Thus, bearing 17 is of a short outer diameter. The thin shank section 1b additionally brings about that the hollow shank can be adapted to a different type of drive or journalling, which makes small diameters advantageous. The shorter shank section 1b additionally permits an easy machining and processing, for instance a chip-removing machining operation, a hardening operation, or the like. Shank section 1b may also take over the function of a race ring of an anti-friction bearing, whereas with a long, continuous hollow shank it would be difficult to machine the same at the bearing sections.

It is, of course, to be understood, that the present invention is, by no means, limited to the particular arrangements shown in the drawing, but also comprises any modifications within the scope of the appended claims.

What I claim is:

1. A two-for-one twisting spindle, which includes: hollow spindle shank means, thread storage disc means fitted on said shank means and provided with passage means extending radially with regard to said shank means, and thread guiding conduit means fitted in said passage means and having the inner end portion thereof fitted in said shank means thereby holding and locating said disc means on said shank means.

2. A two-for-one twisting spindle, which includes: a one-piece tubular spindle shank having two radially extending bores therethrough, thread storage disc means axially fitted on said shank and having passage means substantially axially aligned with said radially extending shank bores, and thread guiding conduit means fitted into said passage means and said shank bores for holding and locating said disc means on said spindle shank, and bearing means arranged above and below said shank bores for rotatably journalling said spindle shank.

3. A two-for-one twisting spindle, which includes: hollow spindle shank means, thread storage disc means fitted on said shank means and having the bottom portion thereof provided with tubular means extending radially with regard to said shank means, that portion of said tubular means which faces away from the bottom of said disc means being provided with slot means extending into the interior of said tubular means, said shank means being provided with radial passage means in substantially axial alignment with said radially extending tubular means, and thread guiding conduit means fitted into said radially extending tubular means and having the inner end portion thereof fitted into said shank passage means thereby holding and locating said disc means on said shank means.

4. A two-for-one twisting spindle, which includes: hollow spindle shank means, thread storage disc means fitted on said shank means and having the bottom portion thereof provided with tubular means extending radially with regard to said shank means, that portion of said tubular means which faces away from the bottom of said disc means being provided with slot means extending into the interior of said tubular means, said shank means being provided with radial passage means in substantially axial alignment with said radially extending tubular means, thread guiding conduit means fitted into said radially extending tubular means and having the inner end portion thereof fitted into said shank passage means thereby holding and locating said disc means on said shank means, said thread guiding conduit means having that portion thereof which is exposed to the outside through said slot means provided with annular groove means.

5. An arrangement according to claim 4, which includes annular spring means arranged in said annular groove means.

6. A two-for-one twisting spindle, which includes: hollow spindle shank means having an upper spindle shank section and a lower spindle shank section having its upper portion telescopically fitted into the lower portion of said upper spindle shank section, the telescopically interengaging portions of said upper and lower shank sections being provided with radially extending substantially axially aligned bores, thread storage disc means fitted on the lower end of said upper shank portion where the latter is telescopically engaged by said lower shank portion, said storage disc means being provided with passage means extending radially with regard to said shank means, and thread guiding conduit means fitted into said passage means and having its lower end fitted into the radially extending axially aligned bores of the telescopically interengaging portions of said upper and lower shank sections.

7. An arrangement according to claim 6, in which said upper and lower shank sections are disengageably connected to each other by said thread guiding conduit means.

References Cited by the Examiner

UNITED STATES PATENTS

| | | | |
|---|---|---|---|
| 2,654,210 | 10/1953 | Bogdanffy et al. | 57—58.76 XR |
| 2,924,064 | 2/1960 | Hedtmann | 57—58.76 |
| 3,159,962 | 12/1964 | Franze | 57—58.49 |
| 3,177,643 | 4/1965 | Halleux et al. | 57—58.86 |

FOREIGN PATENTS 962,357 6/1950 France.

FRANK J. COHEN, *Primary Examiner.*

D. E. WATKINS, *Assistant Examiner.*